(12) United States Patent
Somaiah et al.

(10) Patent No.: US 10,824,384 B2
(45) Date of Patent: Nov. 3, 2020

(54) CONTROLLER FOR PROVIDING SHARING BETWEEN VISUAL DEVICES

(71) Applicant: Dell Products L.P., Round Rock, TX (US)

(72) Inventors: Chetan Pudiyanda Somaiah, Bangalore (IN); Arockiaraj Durairaj, Bangalore (IN); Sudhir Vijendra, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 15/967,028

(22) Filed: Apr. 30, 2018

(65) Prior Publication Data

US 2019/0332344 A1 Oct. 31, 2019

(51) Int. Cl.
*G06F 3/14* (2006.01)
*G06F 3/0484* (2013.01)
(Continued)

(52) U.S. Cl.
CPC .......... *G06F 3/1454* (2013.01); *G06F 3/0486* (2013.01); *G06F 3/04842* (2013.01);
(Continued)

(58) Field of Classification Search
CPC .. G06F 3/1454; G06F 3/04842; G06F 3/0486; G06F 2203/0383; H04M 1/7253; H04M 2250/02
See application file for complete search history.

(56) References Cited

U.S. PATENT DOCUMENTS 10,264,213 B1 * 4/2019 Sculley .................... H04N 7/15
2008/0016155 A1   1/2008 Khalatian
(Continued)

FOREIGN PATENT DOCUMENTS

WO    2017075386 A1    5/2017

OTHER PUBLICATIONS

Miao et al., "H.IPTV-TDES.5 'IPTV Terminal Device: Interworking-Enabled Model of Multiple Devices' Revised Text," International Telecommunication Union, Telecommunication Standardization Sector, Study Group 16, TD 136 (WP/216), Geneva, Oct. 28, 2013, 24 pages.

*Primary Examiner* — Shean Tokuta
*Assistant Examiner* — Juan C Turriate Gastulo
(74) *Attorney, Agent, or Firm* — Ryan, Mason & Lewis, LLP (57) ABSTRACT

A method includes receiving, at a controller device, a request to initiate a sharing action between at least two visual devices wirelessly paired with the controller device. The method also includes selecting, using at least one user interface feature of the controller device, a source visual device for the sharing action and a destination visual device for the sharing action. The method further includes providing one or more resources from a display of the source visual device to a display of the destination visual device by streaming the resources to the controller device in a first display format supported by the source visual device, converting the resources from the first display format to a second display format supported by the destination device, and streaming the resources in the second display format from the controller device to the destination device.

20 Claims, 8 Drawing Sheets

(51) Int. Cl.
*G06F 3/0486* (2013.01)
*H04M 1/725* (2006.01)
(52) U.S. Cl.
CPC ... *H04M 1/7253* (2013.01); *G06F 2203/0383* (2013.01); *H04M 2250/02* (2013.01)

(56) References Cited

U.S. PATENT DOCUMENTS

| | | | |
|---|---|---|---|
| 2011/0304543 A1 | 12/2011 | Chen | |
| 2012/0144347 A1* | 6/2012 | Jo | G06F 3/04883 715/863 |
| 2014/0009394 A1* | 1/2014 | Lee | H04N 5/4403 345/157 |
| 2014/0164966 A1* | 6/2014 | Kim | G06F 3/04886 715/769 |
| 2014/0315489 A1 | 10/2014 | Lee | |
| 2014/0361954 A1* | 12/2014 | Epstein | G06F 3/1454 345/2.3 |
| 2014/0364056 A1 | 12/2014 | Belk et al. | |
| 2015/0019694 A1 | 1/2015 | Feng et al. | |
| 2015/0271561 A1 | 9/2015 | Park | |
| 2016/0227381 A1 | 8/2016 | Bargetzi et al. | |
| 2017/0118271 A1* | 4/2017 | Reyes | H04L 67/06 |

* cited by examiner

CONTROLLER FOR PROVIDING SHARING BETWEEN VISUAL DEVICES

FIELD

The field relates generally to information processing, and more particularly to sharing information between devices.

BACKGROUND

Information sharing between devices is used in a wide variety of application areas. In some cases, information sharing includes sharing screen content from one device to another. Various devices may be paired to provide screen sharing, such as laptops, tablets, mobile devices, smart televisions, etc., using WiFi, Bluetooth® or other technologies. Improvements are needed, however, for implementing information sharing such as screen sharing among multiple devices.

SUMMARY

Illustrative embodiments of the present invention provide techniques for providing sharing and other interaction between multiple visual devices wirelessly paired with a controller device.

In one embodiment, a method comprises receiving, at a controller device, a request to initiate a sharing action between at least two visual devices wirelessly paired with the controller device. The method also comprises selecting, using at least one user interface feature of the controller device, a source visual device for the sharing action. The method further comprises selecting, using the at least one user interface feature of the controller device, at least one destination visual device for the sharing action. The method further comprises providing one or more resources from a display of the source visual device to at least one display of the at least one destination visual device by streaming the one or more resources from the source visual device to the controller device in a first display format supported by the source visual device, converting the one or more resources from the first display format supported by the source visual device to at least a second display format supported by the at least one destination device, and streaming the one or more resources in the second display format from the controller device to the at least one destination device. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Various interface or input/output (I/O) devices can be paired with processing or computing devices such as laptops, tablets, mobile devices such as smartphones, smart televisions, etc. to provide control of such a device. As one example, a mouse be configured for connection to a particular computing device, possibly using wireless technology such as Bluetooth®. Such I/O devices, however, generally act on a one-to-one basis (e.g., a mouse is coupled to a single computing device at a time). Thus, such I/O devices are not suitable for controlling sharing of content among multiple computing devices having visual screens (e.g., visual devices). Other types of devices may be used to facilitate sharing screen content to a visual device. For example, a Chromecast™ device may be connected physically via a High-Definition Multimedia Interface (HDMI) connection to a single visual device such as a smart television. However, this only permits sharing of screen content to the television which the device is connected to and a physical interconnection is required between the device and the television.

Screen sharing technology may be used to permit a single computing device to share content among multiple visual screens (e.g., a primary and a secondary screen) which are physically connected to the computing device. An example is a desktop computer with multiple monitors, where a user may move an application from the primary screen to the secondary screen (e.g., from one monitor to another, from a monitor to a television, etc.). Another example is a laptop computer that is connected via an HDMI or other cable to a television screen in a conference room. A user of the laptop computer may move or mirror an application or program from the laptop monitor to the television screen for sharing with other viewers in the conference room while the user continues to do work (possibly on a different application) on the laptop computer.

The above-described arrangements typically require hardwire or cable connectivity between visual devices (e.g., a hardwire physical cable connecting a laptop to a television, a desktop to multiple monitors, etc.). Such arrangements further demand that the visual devices have certain required ports available (e.g., both the laptop and the television must be equipped with available HDMI or other suitable connection ports, etc.) to enable screen sharing.

Illustrative embodiments provide controller devices which may be used to provide screen or other sharing between visual devices that are wirelessly connected to a controller device. Advantageously, controller devices described herein permit sharing of screen and other content among multiple visual devices wirelessly connected to the controller device.

Figure 1:
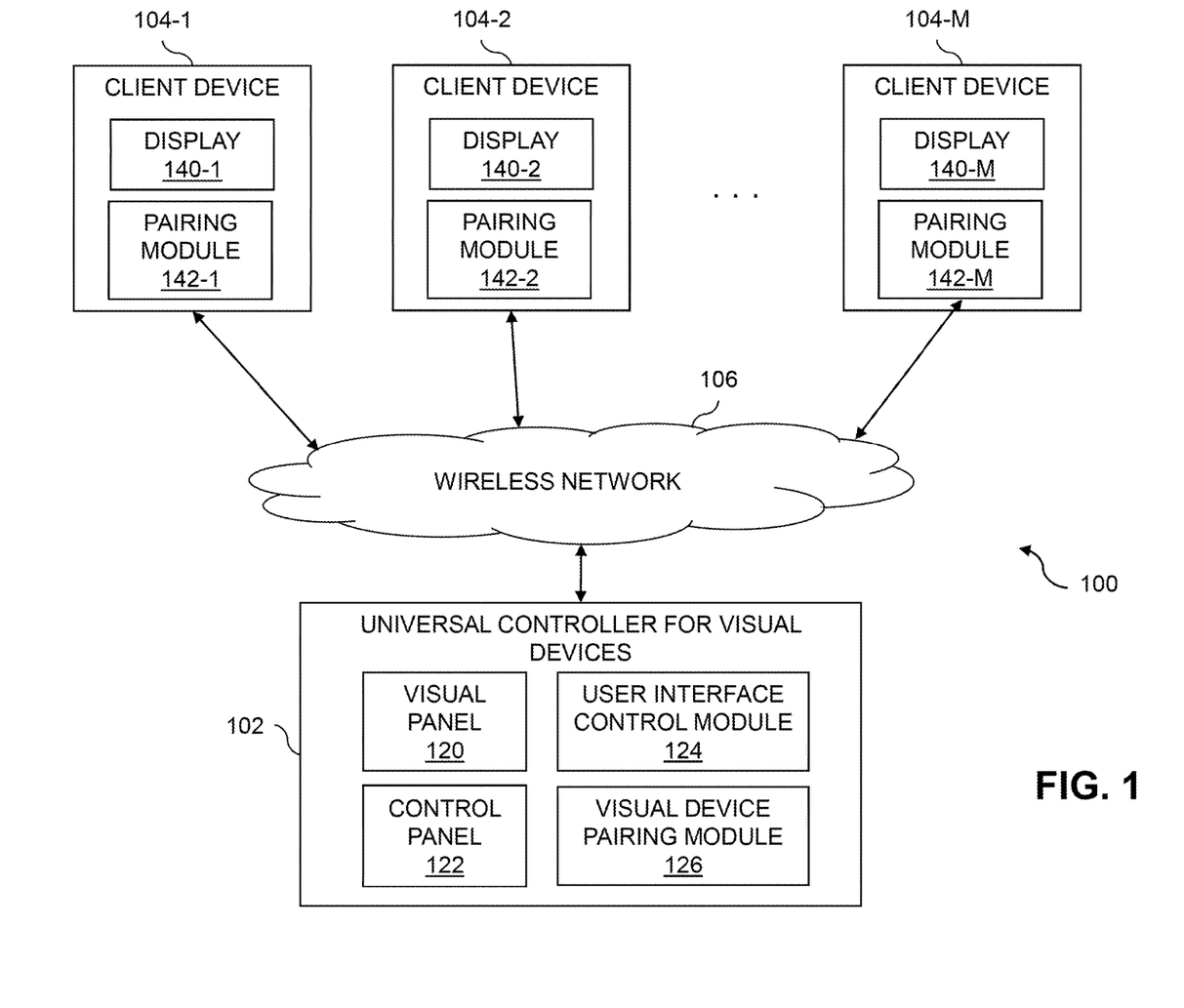
FIG. 1 is a block diagram of an information processing system for sharing screen content among multiple devices in an illustrative embodiment of the invention.

FIG. 1 shows an information processing system 100 configured in accordance with an illustrative embodiment. The information processing system 100 is assumed to be built on at least one processing platform and provides functionality by which a universal controller for visual devices 102 (also referred to herein as universal controller 102) provides functionality for sharing screen or other content among multiple visual devices, represented in FIG. 1 as client devices 104-1, 104-2, . . . 104-M (collectively, client devices 104). The universal controller 102 and client devices 104 are paired via one or more wireless networks 106.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

Each of the client devices 104 includes a respective display 140-1, 140-2, . . . 140-M (collectively, displays 140) and a respective pairing module 142-1, 142-2, . . . 142-M (collectively, pairing module 142). The displays 140 may be any type of visual display or screen, such as a liquid crystal display (LCD), a light-emitting diode (LED) display, etc. The pairing modules 142 provide functionality for pairing the client devices 104 with the universal controller 102.

The universal controller 102 is configured to act as a connector facilitating sharing of screen and other content (e.g., files) across the client devices 104 connected thereto. The universal controller 102, in some embodiments, wirelessly pairs with the client devices 104, each of which has visual capability through respective displays 140. As shown in FIG. 1, the universal controller 102 includes a visual panel 120, a control panel 122, a user interface control module 124, and a visual device pairing module 126.

The universal controller 102, through user interface control module 124, is configured to seamlessly access resources on screens or displays 140 of connected ones of the client devices 104, enabling movement of files or resources for screen sharing between connected ones of the client devices 104. Such files or other resources flow through the universal controller 102, e.g., a first stream of information is set up between a source visual device and the universal controller 102, and at least a second stream is set up between the universal controller and at least one destination visual device. The source and destination visual devices represent respective ones of the client devices 104 connected to the universal controller 102 that are selected via the user interface control module 124 of the universal controller 102. The universal controller 102, through visual device pairing module 126, sets up such streams and provides functionality for converting visual information from a source display format supported by the source visual device to a destination display format supported by the destination visual device (e.g., converting between aspect ratios, resolution, frame rate, etc.). Information regarding supported display formats for visual devices may be obtained by the visual device pairing module 126 of universal controller 102 during initial pairing or registration of client devices 104.

The visual panel 120 of universal controller 102 provides a screen or display on which information or feedback regarding sharing actions between source and destination visual devices is presented. For example, the visual panel 120 may provide selectable display elements representing the displays 140 of connected ones of the client devices 104 (or portions thereof such as particular files, application windows, etc. on the displays 140). Responsive to action via the user interface control module 124, a user may select a display element for one of the displays 140 of a connected client device 104 (or a portion thereof, such as a particular application or program's visual information) to share with a destination visual device. In some embodiments, selection of the destination visual device is provided by a user dragging and dropping the display element for the display 140 of one of the connected client devices 104 onto display elements for other displays 140 of one or more other ones of the connected client devices 104.

The control panel 122 of universal controller 102 provides various status information on a screen or display. In some embodiments, the control panel 122 and visual panel 120 are implemented as different portions of a same screen or display. In other embodiments, the control panel 122 and visual panel 120 are implemented as physically distinct screens or displays. The control panel 122 may also be implemented as a series of visual indicators or status lights (e.g., LEDs) providing various status information. The status information presented on control panel 122 may include information regarding connections between client devices 104 and the universal controller 102 (e.g., connection status, whether a particular client device 104 is a currently selected source or destination visual device, etc.). The status information presented on control panel 122 may alternatively or additionally include information regarding the universal controller 102 itself, such as a charging status, network connection status, number of active connections to visual devices, number of active sharing actions, etc.

The universal controller 102 is configured to act as a connector for a set of visual devices (e.g., connected ones of the client devices 104) for sharing of content (e.g., screen sharing, movement of files, etc.) across them for visualization purposes. The universal controller 102 is expected to be paired with one or more of the client devices 104 that have visual capabilities, and utilizes user interface control module 124 (e.g., which may be implemented through the use of a rolling ball type interface device as will be described in further detail below) for seamlessly selecting resources on screens or displays 140 of connected ones of client devices 104 and enabling sharing or moving such resources between screens or displays 140 of connected ones of the client devices 104.

The universal controller 102 provides advantages for a wide range of use case scenarios. As an example, the universal controller 102 may be connected to two client devices 104-1 and 104-2 representing a user's mobile computing device (e.g., smartphone, laptop, tablet, etc.) and a smart television, respectively. In this home or domestic use case scenario, the universal controller 102 is used to move a picture file from the user's mobile computing device to the smart television without having to hardwire a connection between the user's mobile computing device and the smart television, and without having to hardwire any connection between the universal controller 102 and the user's mobile computing device or smart television.

As another example, the universal controller 102 may be connected to two client devices 104-1 and 104-2 which represent a user's laptop and a smart television in a conference room. In this work use case scenario, the universal controller 102 is used to project content from the user's laptop screen or display to the smart television, without having to hardwire a connection between the laptop and the smart television, and without having to hardwire any connection between the universal controller 102 and the user's mobile computing device or smart television.

In some embodiments, the client devices 104 may be paired with the universal controller 102 to facilitate the above and other use case scenarios, such as using the pairing modules 142 of client devices 104 and the visual device pairing module 126 of universal controller 102. In some embodiments, this involves setting up credentials or other authentication to automatically pair the client devices 104 with the universal controller 102 when in range. If previously paired or setup, the universal controller 102 can thus automatically connect with any client devices 104 within a defined range (e.g., at a home, work, a conference facility, etc.). The universal controller 102 may thus be configured to instantly recognize when client devices 104 are within range, to enable screen or other information sharing as described herein. The defined range may be based on a wireless protocol used to establish connections between the universal controller 102 and the client devices 104 (e.g., WiFi, Bluetooth®, etc.). The universal controller 102 is thus configured to enable screen sharing and file sharing seamlessly among multiple visual devices after one-time pairing.

In a screen sharing scenario, the universal controller 102 may be placed or fixed in a conference room or other facility, allowing users to configure pairing of client devices such as laptops, smartphones, tablets, etc. for a first time. The universal controller 102 in such embodiments may be physically embodied with a small, thin sheet form factor similar to a tablet computing device but suitably equipped with a visual panel 120, control panel 122 and a user interface control module 124 (e.g., a rolling mouse type device as will be described in further detail below). A smart television or other visual devices in the conference room or facility are assumed to be paired with or configured for pairing with the universal controller 102 when in range. As mentioned above, such pairing of client devices 104 with the universal controller 102 may utilize various protocols and technologies such as Bluetooth® 4.0, WiFi, Chromecast™, etc. When a user enters within range of the conference room having the universal controller 102, any previously-paired client device 104 carried by that user will automatically connect with the universal controller 102 and have access to project content from the screen of that previously-paired client device 104 with the smart television or other visual devices in the conference room. The user may also pair any new (e.g., not previously paired) client devices 104 with the universal controller 102 as desired.

The universal controller 102, which may be a fixed device (e.g., such as fixed or attached to a conference table, lectern, etc.), controls which of the client devices 104 connected to the universal controller 102 will share content with one another (e.g., to the smart television or another fixed visual device in the conference room, among multiple mobile devices such as laptops of multiple users that are within range of the universal controller 102, etc.). Advantageously, this eliminates the requirement of any hardwiring of connections between the various visual devices (both to one another and to a specialized controller device), and also avoids or obviates the need for special or required ports (e.g., HDMI or other connections) to be made available in the visual devices. In some embodiments, the universal controller 102 need not be fixed at a given location (e.g., within one conference room), and instead may be made mobile allowing for pairing with visual devices in multiple conference rooms or other locations within a network or other facility as the universal controller 102 is moved among such different locations.

In a file sharing scenario, it is assumed that a user wants to provide a view or snapshot of a document, file, image, etc. to another user. A first user is the one who wants to share the file, and has the file in his or her laptop or other visual device. A second user who wants to view the file has a tablet or other visual device. The first user and the second user may pair their respective devices (e.g., the first user's laptop and the second user's tablet) with the universal controller 102. After such pairing, the screens or displays of the first user's laptop and the second user's tablet may be controlled through the universal controller 102, with the user interface control module 124 being used to select and drag a file from the first user's laptop and drop it onto the second user's tablet (e.g., using selectable display elements on the visual panel 120 of the universal controller 102). Responsive to such action by the user interface control module 124, a copy of the original file is transferred from the first user's laptop and a read-only copy of that file is made available in the second user's tablet. In some embodiments, it is desired that the second user be able to view the file without making changes to the original source file in the first user's laptop.

It is to be appreciated that the particular arrangement of the universal controller 102 and client devices 104 illustrated in the FIG. 1 embodiment is presented by way of example only, and alternative arrangements can be used in other embodiments. As an example, the functionality associated with the visual panel 120 and control panel 122 may in some embodiments be combined (e.g., such as into a same display panel or screen). As another example, functionality of the user interface control module 124 and visual device pairing module 126 may be separated across more than two modules, with the multiple modules possibly being implemented with multiple distinct processors or processing devices, or may be combined into a single module.

At least portions of the user interface control module 124 and visual device pairing module 126 may be implemented at least in part in the form of software that is stored in memory and executed by a processor.

Figure 2:
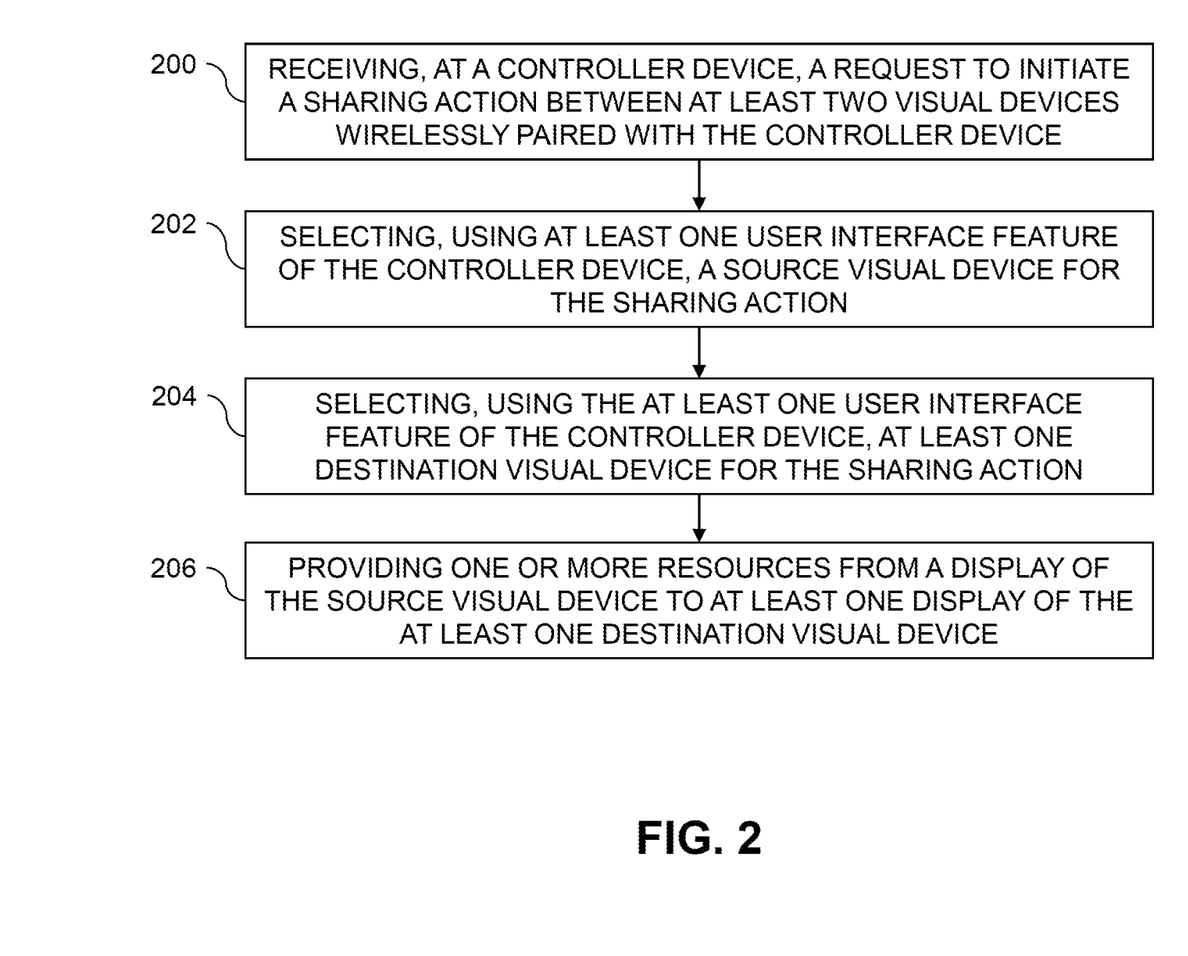
FIG. 2 is a flow diagram of an exemplary process for sharing screen content in an illustrative embodiment.

An exemplary process for sharing screen content utilizing universal controller 102 will now be described in more detail with reference to the flow diagram of FIG. 2. It is to be understood that this particular process is only an example, and that additional or alternative processes for sharing screen content utilizing universal controllers or connectors described herein can be carried out in other embodiments.

In this embodiment, the process includes steps 200 through 206. These steps are assumed to be performed by the universal controller 102. The process begins with step 200, receiving, at a controller device such as universal controller 102, a request to initiate a sharing action between at least two visual devices (e.g., client devices 104) wirelessly paired with the controller device. The process continues with step 202, selecting, using at least one user interface feature (e.g., user interface control module 124) of the controller device, a source visual device for the sharing action. The process continues with step 204, selecting, using the at least one user interface feature of the controller device, at least one destination visual device for the sharing action. The process concludes with step 206, providing one or more resources from a display of the source visual device to at least one display of the at least one destination visual device by streaming the one or more resources from the source visual device to the controller device in a first display format supported by the source visual device, converting the one or more resources from the first display format supported by the source visual device to at least a second display format supported by the at least one destination device, and streaming the one or more resources in the second display format from the controller device to the at least one destination device.

In some embodiments, the sharing action comprises a screen sharing action. The screen sharing action may comprise sharing a selected resource on the display of the source visual device with the at least one destination visual device. The selected resource may comprise an application running on the source visual device, or a document, image or file on a display of the source visual device.

In some embodiments, the sharing action comprises a file sharing action. In the file sharing action, selecting the source visual device in step 202 comprises selecting a source file available on the source visual device and providing the one or more resources from the display of the source visual device to the at least one destination visual device in step 206 comprises copying the selected source file to the controller device and providing a read-only copy of the selected source file to the at least one destination device.

The controller device may comprise a visual panel such as visual panel 120 configured to present selectable display elements corresponding to visual devices currently paired with the controller device. Selecting the source visual device for the sharing action in step 202 may comprise utilizing the at least one user interface feature of the controller device to navigate to and select a given one of the selectable display elements corresponding to the source visual device in the visual panel. Selecting the given selectable display element corresponding to the source visual device in the visual panel may further comprise utilizing the at least one user interface feature to select at least one selectable display element corresponding to the one or more resources from the display of the source visual device in the visual panel. Selecting the at least one destination visual device in step 204 may comprise utilizing the at least one user interface feature to drag and drop the one or more resources from the display of the source device to at least one selectable display element corresponding to the at least one destination device in the visual panel. The at least one user interface feature of the controller device may comprise a rolling mouse interface device.

Figure 3:
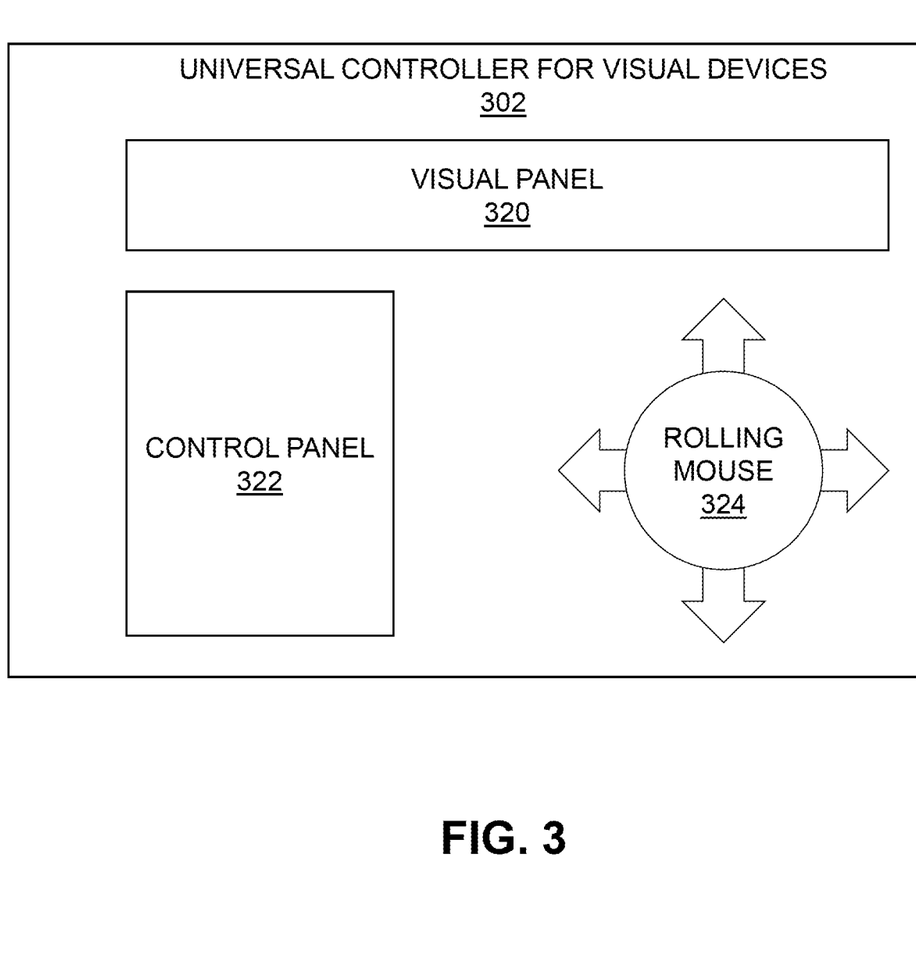
FIG. 3 is a block diagram of a controller device for sharing screen content among multiple visual devices in an illustrative embodiment.

FIG. 3 shows a universal controller 302 including a visual panel 320, a control panel 322 and a rolling mouse 324. The visual panel 320 is a screen or display element that is configured to provide information or feedback on ongoing activity of active connections between the universal controller 302 and one or more visual devices connected thereto. For example, the visual panel 320 may provide information or feedback regarding a drag and drop action between two visual devices, a currently active connection (e.g., between a laptop A and a smart television X, etc.). The control panel 322 is a screen or display element that is configured to provide information regarding the universal controller 302, such as a charging status of the universal controller 302, connection status between the universal controller 302 and one or more visual devices, etc. In some embodiments, the visual panel 320 and control panel 322 are implemented as physically distinct screens or other display elements. In other embodiments, the visual panel 320 and control panel 322 may represent different portions of a same screen or display element.

The universal controller 302 also includes a rolling mouse 324, which is an example of a physical interface device used to control screen sharing between visual devices. For example, the rolling mouse 324 may be implemented as a "ball" that can be rolled in any direction (indicated by the four arrows extending from the rolling mouse 324 in FIG. 3). The rolling mouse 324 may also have one or more clickable buttons or other user interface features (e.g., the ball may be pressure sensitive to indicate "clicking" or selection actions, the ball may have some designated amount of inwards travel such that the ball or at least a portion thereof can be pushed in to indicate clicking or selection actions, etc.). The rolling mouse 324 enables a user to select visual devices, and to select particular resources from the selected visual devices for sharing (e.g., by dragging and dropping a resource from one visual device to another, etc.). Such actions may be reflected in the visual panel 320 of the universal controller 302, which shows currently selected visual devices (or currently selected resources on displays or screens thereof) and available visual devices to which the current selection may be dropped to initiate screen and/or file sharing as described herein.

Figure 4:
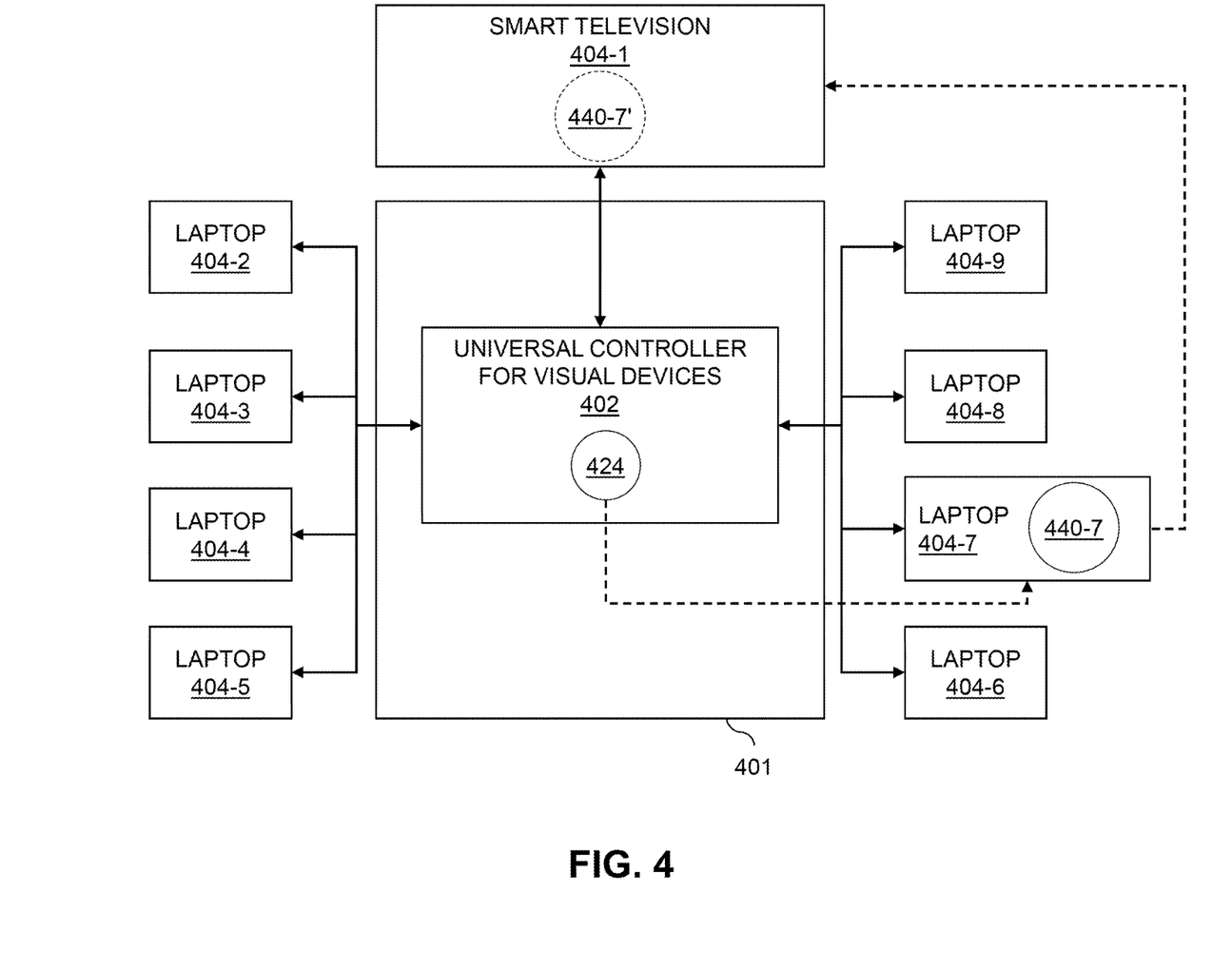
FIG. 4 is a block diagram illustrating sharing of screen content using a controller device in a conference room in an illustrative embodiment.

FIG. 4 illustrates sharing of screen content using a universal controller 402 that is placed in a conference room (e.g., on a conference table 401). In this embodiment, the universal controller 402 is assumed to be fixed on the conference table 401 of the conference room. It should be appreciated however, that this is not a requirement and that in other embodiments the universal controller 402 may be portable such that it can be moved within a facility (e.g., between different conference rooms or more generally rooms or locations within a building or facility) or between two or more facilities (e.g., between two offices, an office and a home, etc.). In the FIG. 4 embodiment, it is assumed that a number of client devices are paired or otherwise configured for connection with the universal controller 402, including a smart television 404-1 and laptops 404-2 through 404-9 (collectively, client or visual devices 404). The connections between the visual devices 404 and the universal controller 402 may utilize Bluetooth® or another suitable wireless connection protocol.

While FIG. 4 shows an arrangement with only one smart television and multiple laptops, the number and types of client or visual devices 404 may vary as desired (e.g., there may be multiple smart televisions, and other visual devices such as smartphones, tablets, etc. configured for pairing with the universal controller 402). The client devices 404 are assumed to include respective screens or other displays, and have paired with or are configured for pairing with the universal controller 402 (e.g., using an appropriate authentication system).

In the FIG. 4 scenario, assume that in a first step a user brings laptop 404-7 into the conference room, with the laptop 404-7 being previously paired with or configured for connection to the universal controller 402. The universal controller 402 recognizes the laptop 404-7, and lists the laptop 404-7 as a connected system (e.g., such as in a designated portion of a visual panel of the universal controller 402). In some embodiments, the universal controller 402 may be configured with a predefined range within which visual devices 404 must be in order to connect to the universal controller 402. In some cases, this range is defined by the communication protocol (e.g., Bluetooth®, near field communication (NFC), WiFi, etc.). In other cases, this range may be defined by a certain wireless signal strength. By defining such a range, the universal controller 402 may ensure that only visual devices 404 that are within the boundaries of the conference room are listed as available (e.g., on a visual panel of the universal controller 402).

A user utilizes a user interface control 424 (e.g., a rolling ball-type mouse or other interface hardware such as a touchscreen panel, etc.) of the universal controller 402 to select the laptop 404-7 for sharing. In some embodiments, the selection of laptop 404-7 includes selection of an entire display or screen of the laptop 404-7. In other embodiments, the selection of laptop 404-7 may include selection of particular designated resources (e.g., files, applications, windows, etc.) on the display or screen of the laptop 404-7 for sharing. The selected portion of the laptop 404-7 is denoted in FIG. 4 as element 440-7.

The user interface control 424 of the universal controller 402 is used to select a destination visual device for the selected resource 440-7. In the FIG. 4 example, the selected destination is the smart television 404-1, and the selected resource 440-7 from the laptop 404-7 is presented on a screen or display of the smart television 404-1, as indicated by the element 440-7' shown in dashed outline in FIG. 4. During such selection (of the source and destination for screen sharing), a visual panel of the universal controller 402 provides feedback on the source and destination, selected resources, currently active screen shares, etc. The selection of the destination visual device may be via actuation of the user interface control 424 to drag and drop a selection from a source visual device to the destination visual device.

Another user may repeat the above activities, so as to provide additional screen sharing actions. For example, a user may utilize the user interface control 424 of universal controller 402 to choose a file or other resource from the laptop 404-3 to display on the smart television 404-1 (or on another one of the laptops 404-2 through 404-9 connected or paired with the universal controller 402). If a new screen sharing action conflicts (e.g., such as when the user seeks to share a resource from laptop 404-3 on the screen of display of smart television 404-1 which is already displaying selected resource 440-7' from laptop 404-7), the earlier screen sharing action is discontinued and the new screen sharing action becomes active. In some embodiments, a given visual device (e.g., smart television 404-1) may be configured for multiple screen sharing actions, such that sharing of resources from multiple source ones of the visual devices 404 may be provided simultaneously or at least partially overlapping on one or more destination ones of the visual devices 404. For example, the universal controller 402 may be used to set up screen sharing from two of the laptops 404-2 through 404-9 on the screen or display of smart television 404-1 at a same time (e.g., on different portions of the screen or display of smart television 404-1, at least partially overlaying one another on a same portion of the screen or display of smart television 404-1, etc.).

In some embodiments, a same selected resource may be shared with multiple visual devices utilizing universal controller 402. For example, the user interface control 424 of universal controller 402 may be used to share the selected resource 440-7 not only with the smart television 404-1 but also with one or more other ones of the laptops 404-2 through 404-9, with multiple such screen sharing actions being active at a same time or at least partially overlapping one another.

In some embodiments, multiple universal controllers may be connected via the Internet or other network (e.g., a corporate network) by presenting appropriate authentication, so that data (e.g., registration data for paired visual devices, etc.) may be synchronized and available therebetween. Thus, a user that has registered his or her laptop with one of a set of interconnected universal controllers in a first fixed location (e.g., a conference room A) can move to a second fixed location (e.g., a conference room B) having another one of the set of interconnected universal controllers and start screen sharing seamlessly without having to individually register or configure with each of the universal controllers in the set of interconnected universal controllers.

Figure 5:
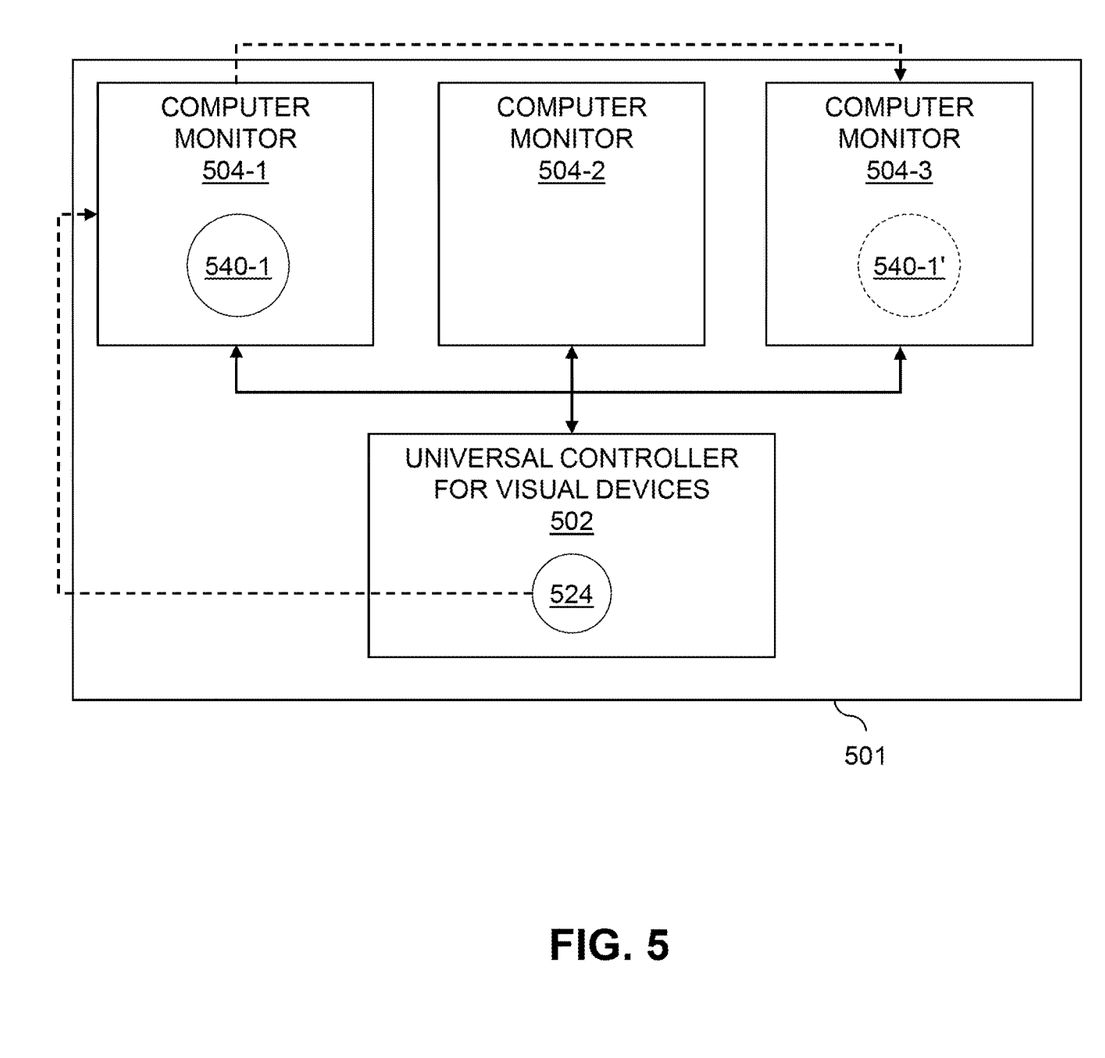
FIG. 5 is a block diagram illustrating sharing of screen content using a controller device at a work station in an illustrative embodiment.

FIG. 5 illustrates sharing of screen content using a universal controller 502 that is placed at a workstation or work place (e.g., on a desk 501). In this embodiment, the universal controller 502 is assumed to be fixed on the desk 501 of the workstation. It should be appreciated, however, that this is not a requirement and that in other embodiments the universal controller 502 may be portable such that it can be moved within a facility (e.g., from one workstation to another) or between two or more facilities (e.g., from an office workstation to a home workstation, etc.). In the FIG. 5 embodiment, it is assumed that a number of client devices are paired or otherwise configured for connection with universal controller 502, including computer monitors 504-1, 504-2 and 504-3 (collectively, computer monitors 504 or client or visual devices 504). The connections between the visual devices 504 and the universal controller 502 may utilize Bluetooth® or another suitable connection protocol.

While FIG. 5 shows an arrangement which includes three computer monitors 504 as visual devices, embodiments are not so limited. In other embodiments, a workstation may include more or fewer than three computer monitors, or may include various types of visual devices (e.g., desktop computer monitors, laptop computer monitors, smart televisions, tablets, smartphones, etc.) that are configured for pairing with universal controller 502. The computer monitors 504 are assumed to include respective screens or other displays, and have paired with or are configured for pairing with the universal controller 502 (e.g., using an appropriate authentication system).

In the FIG. 5 scenario, the workstation may be shared by a small group of users, such as a scenario where the three computer monitors 504 represent monitors of laptops or tablets of three different users. It should be appreciated, however, that the workstation may include multiple visual devices that are used primarily by a single user rather than having the workstation be shared amongst a group of users.

It is assumed that the visual devices of FIG. 5 are paired with or otherwise configured for connection to the universal controller 502. In a first step, a first user of computer monitor 504-1 seeks to share file or screen content with a second user of computer monitor 504-3. The first user of computer monitor 504-1 may utilize a user interface control 524 (e.g., a rolling ball-type mouse or other interface hardware such as a touchscreen panel, etc.) of the universal controller 502 to select a file or other resource 540-1 on a screen or display of the computer monitor 504-1 for sharing with the second user of computer monitor 504-3. The first user of computer monitor 504-1 may further utilize the user interface control 524 of the universal controller 502 to drop the selected file or resource 540-1 on the computer monitor 504-3. In response, the universal controller 502 receives a snapshot of the selected file or resource 540-1 on the computer monitor 504-1. The universal controller 502 provides the selected file or resource 540-1 to the second user as a read-only file 540-1' on computer monitor 504-3, as illustrated by the dashed outline of element 540-1' in FIG. 5. In some embodiments, the copied resource 540-1' is a copy with no connection to the source resource 540-1 on the computer monitor 504-1. Thus, once the resource 540-1 is shared to the destination (e.g., computer monitor 504-3), the action is complete and the second user of the computer monitor 504-3 will not be able to synchronize the file or resource 540-1' back to the source (e.g., computer monitor 504-1), nor will subsequent changes in the file or resource 540-1 at the source be reflected in the copied resource 540-1' at the destination.

Similar to the use case scenario of FIG. 4 described above, multiple file or resource sharing actions may be performed using the universal controller 502, between a same pair of the computer monitors 504 or between different pairs of the computer monitors 504. Further, a file or resource sharing action may select multiple destinations (e.g., the resource 540-1 may also be copied to computer monitor 504-2 in a same or different resource sharing transaction as desired).

Figure 6:
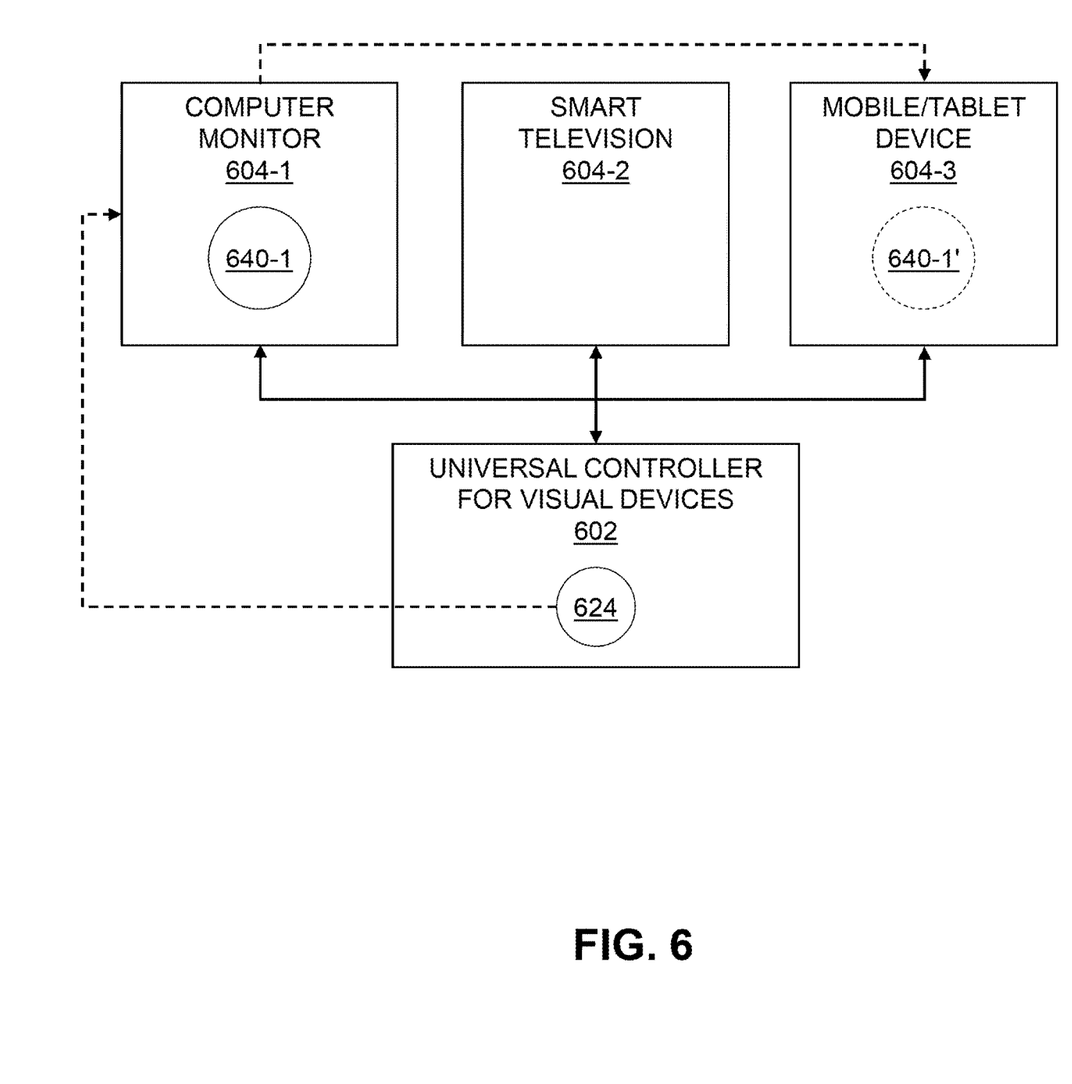
FIG. 6 is a block diagram illustrating sharing of screen content using a controller device in a home environment in an illustrative embodiment.

FIG. 6 illustrates sharing of screen content using a universal controller 602 that is placed in a home environment. In the FIG. 6 embodiment, it is assumed that a number of client devices are paired or otherwise configured for connection with universal controller 602, including a computer monitor 604-1, a smart television 604-2, and a mobile or tablet device 604-3 (collectively, client or visual devices 604). The connections between the visual devices 604 and the universal controller 602 may utilize Bluetooth® or another suitable connection protocol.

While FIG. 6 shows an arrangement which includes three visual devices 604 in the home environment, embodiments are not so limited. In other embodiments, a home environment may include more or fewer than three visual devices, and may include various other types of visual devices or multiple instances of a given type of visual device (e.g., multiple smart televisions, multiple mobile devices, multiple computer monitors, etc.) that are configured for pairing with universal controller 602. The visual devices 604 are assumed to include respective screens or other displays, and have paired with or are configured for pairing with the universal controller 602 (e.g., using an appropriate authentication system).

In the FIG. 6 scenario, the universal controller 602 may be fixed in the home environment (although this is not a requirement) where family members or guests (more generally, users) using visual devices 604 pair such devices with the universal controller 602 to enable screen sharing or resource sharing.

Assume that in a first step a first user of computer monitor 604-1 seeks to share file or screen content with a second user of the mobile device 604-3. The first user of computer monitor 604-1 may utilize a user interface control 624 (e.g., a rolling ball-type mouse or other interface hardware such as a touchscreen panel, etc.) of the universal controller 602 to select the computer monitor 604-1 as a source device for screen sharing. In some embodiments, this may involve sharing a particular picture, file or other resource 640-1 on the computer monitor 604-1 with a destination device. The first user of computer monitor 604-1 may further utilize the user interface control 624 of the universal controller 602 to drop the selected resource 640-1 on the mobile device 604-3, as indicated by resource 640-1' shown in dashed outline in FIG. 6.

Similar to the use case scenarios of FIGS. 4 and 5 described above, multiple screen sharing or resource sharing actions may be performed using the universal controller 602, between a same pair of the visual devices 604 or between different pairs of the visual devices 604. Further, a screen sharing or resource sharing action may select multiple destinations (e.g., the resource 640-1 may also be copied to smart television 604-2 in a same or different resource sharing transaction as desired).

In the above description of the use case scenarios of FIGS. 4-6, it is assumed that at least some of the visual devices 404, 504, 604 are associated with different users. Thus, various screen sharing or resource sharing actions were described with respect to a "first user" and a "second user." In some embodiments, however, different visual devices may be associated with a same user, and the screen sharing or resource sharing action may take place between two visual devices that are currently being utilized by a same user. For example, a user may wish to share screen content from his or her mobile device (having a relatively small display) to a tablet device or laptop (having a relatively large display).

Universal controllers described herein may be configured with firmware or drivers that permit the universal controller to interpret and display shared content. Thus, as discussed above, a universal controller may be configured to convert or transform shared content from a source visual device display format to a destination visual device display format to set up sharing actions. Such conversion or transformation may include adjusting aspect ratios, scaling, resolution, refresh rates, colors, etc.

Embodiments provide a number of advantages. Universal controllers described herein enable interaction among multiple visual devices. Illustratively, such interaction may allow screen sharing or resource sharing without hardwire connections between the visual devices, or between any of the visual devices and a universal controller. Universal controllers may also be interconnected, such that one-time registration with one of a set of interconnected universal controllers permits plug and play functionality with each of the interconnected universal controllers (e.g., across multiple locations in a same facility such as multiple conference rooms, etc.). Intelligent drivers and other firmware may be built into universal controllers, to manage coordination across visual devices including moving files within or between peer visual devices or machines seamlessly.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
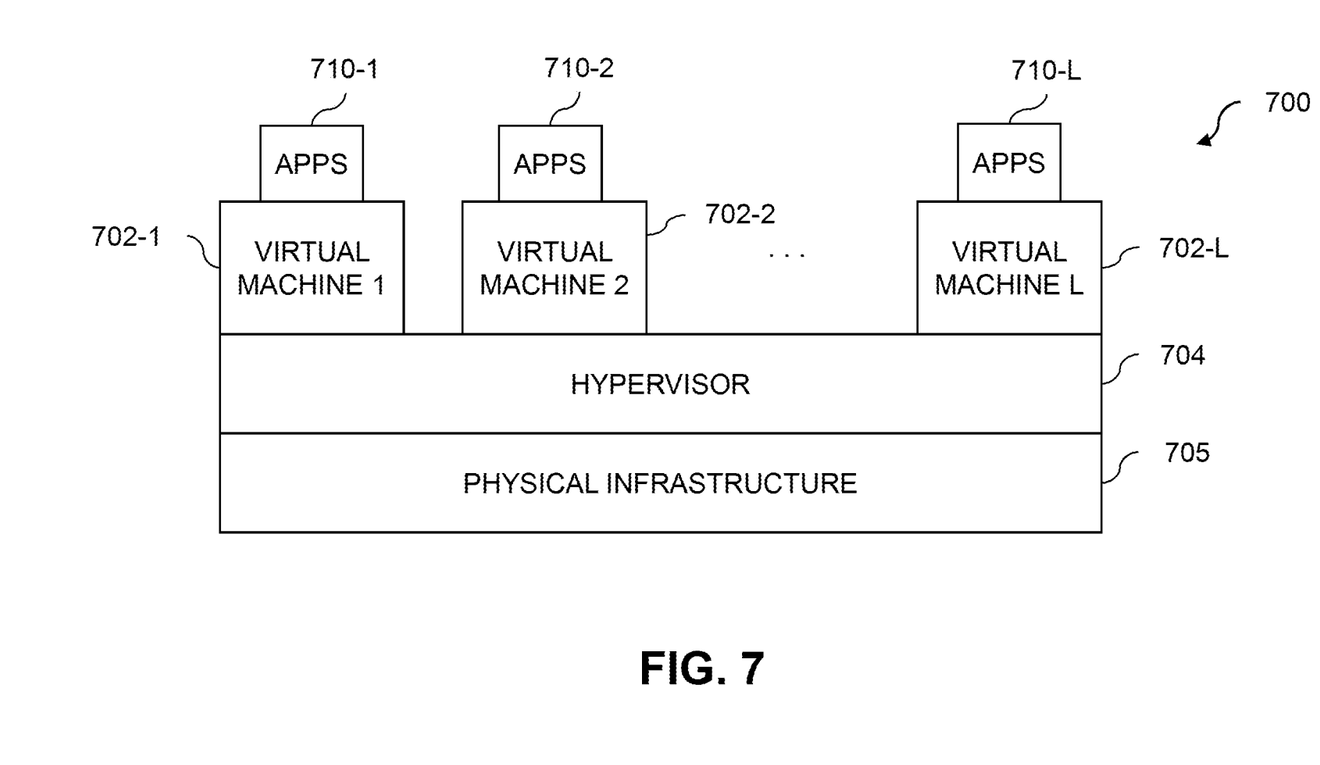
FIGS. 7 and 8 show examples of processing platforms that may be utilized to implement at least a portion of the FIG. 1 system.
Figure 8:
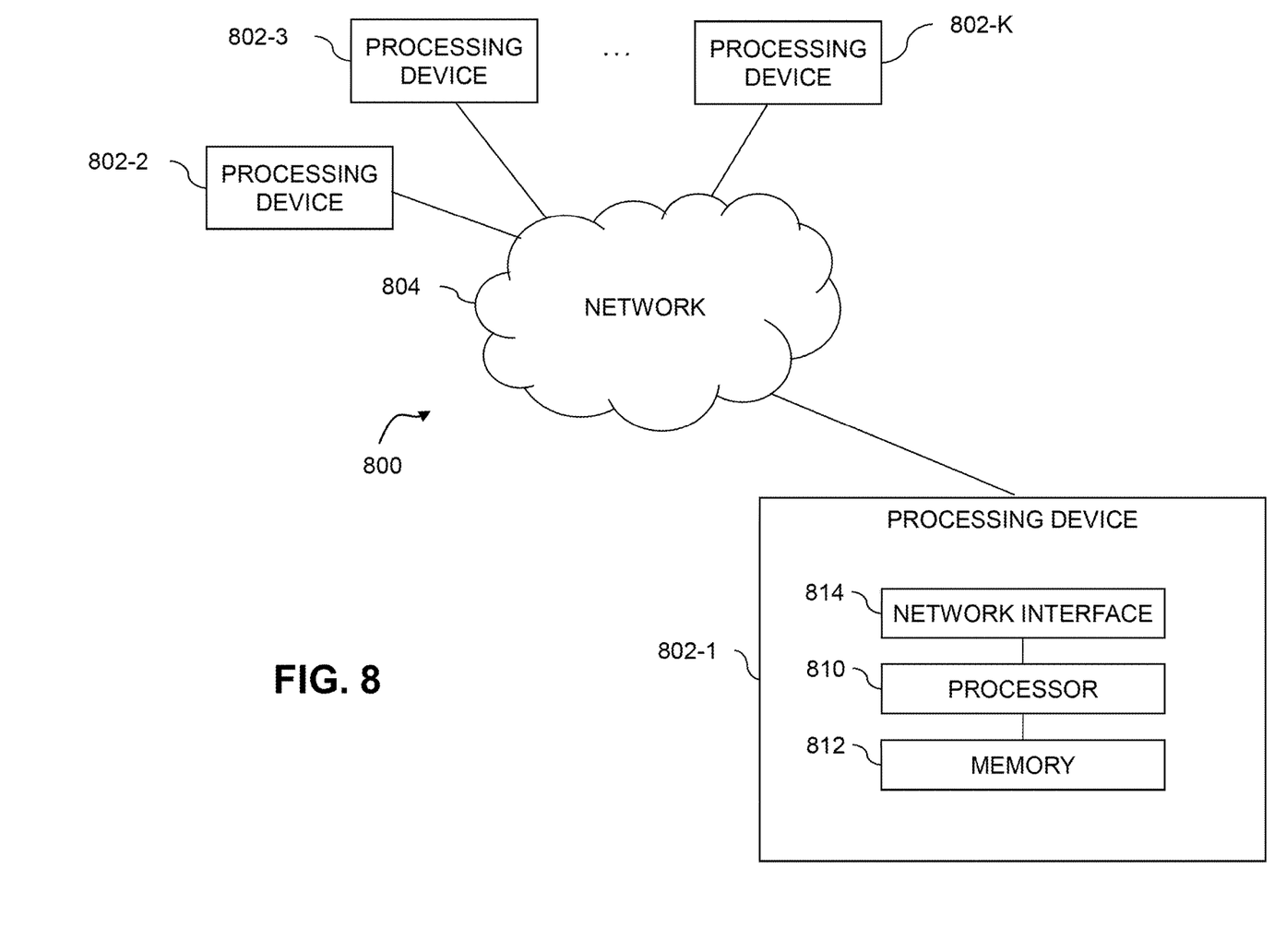

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for screen sharing as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for screen sharing are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the screen sharing functionality described herein. Also, the particular configurations of system and device elements shown in the figures can be varied in other embodiments. Thus, for example, the particular type and number of visual devices deployed in a given embodiment may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   establishing, at a first controller device at a first location, a wireless pairing with at least two visual devices, the first controller device being one of a set of two or more interconnected controller devices, the set of interconnected controller devices being physically distinct from the at least two visual devices, wherein a given one of the at least two visual devices is registered by a second controller device in the set of two or more interconnected controller devices at a second location different than the first location, the first controller device utilizing previously-established registration data for the given visual device received from the second controller device to establish the wireless pairing with the given visual device when the given visual device is within a designated range of the first location;
   receiving, at the first controller device, a request to initiate a sharing action between the at least two visual devices wirelessly paired with the first controller device;
   selecting, using at least one user interface feature of the first controller device, a source visual device for the sharing action;
   selecting, using the at least one user interface feature of the first controller device, at least one destination visual device for the sharing action; and
   providing one or more resources from a display of the source visual device to at least one display of the at least one destination visual device by:
      streaming the one or more resources from the source visual device to the first controller device in a first display format supported by the source visual device;
      converting the one or more resources from the first display format supported by the source visual device to at least a second display format supported by the at least one destination visual device; and streaming the one or more resources in the second display format from the first controller device to the at least one destination visual device;

wherein the method is performed by at least one processing device comprising a processor coupled to a memory.

2. The method of claim 1 wherein the sharing action comprises a screen sharing action.

3. The method of claim 2 wherein the screen sharing action comprises sharing a selected resource on the display of the source visual device with the at least one destination visual device.

4. The method of claim 2 wherein the selected resource comprises an application running on the source visual device.

5. The method of claim 2 wherein the selected resource comprises a document, image or file on the display of the source visual device.

6. The method of claim 1 wherein the sharing action comprises a file sharing action.

7. The method of claim 6 wherein:

selecting the source visual device comprises selecting a source file available on the source visual device; and providing the one or more resources from the display of the source visual device to the at least one destination visual device comprises copying the selected source file to the first controller device and providing a read-only copy of the selected source file to the at least one destination visual device.

8. The method of claim 1 wherein the first controller device comprises a visual panel configured to present selectable display elements corresponding to visual devices currently paired with the first controller device.

9. The method of claim 8 wherein selecting the source visual device for the sharing action comprises utilizing the at least one user interface feature of the first controller device to navigate to and select a given one of the selectable display elements corresponding to the source visual device in the visual panel.

10. The method of claim 9 wherein selecting the given selectable display element corresponding to the source visual device in the visual panel further comprises utilizing the at least one user interface feature to select at least one selectable display element corresponding to the one or more resources from the display of the source visual device in the visual panel.

11. The method of claim 9 wherein selecting the at least one destination visual device comprises utilizing the at least one user interface feature to drag and drop the one or more resources from the display of the source visual device to at least one selectable display element corresponding to the at least one destination visual device in the visual panel.

12. The method of claim 9 wherein the at least one user interface feature comprises a rolling mouse interface device.

13. A computer program product comprising a non-transitory processor-readable storage medium having stored therein program code of one or more software programs, wherein the program code when executed by at least one processing device cause the at least one processing device:

to establish, at a first controller device at a first location, a wireless pairing with at least two visual devices, the first controller device being one of a set of two or more interconnected controller devices, the set of interconnected controller devices being physically distinct from the at least two visual devices, wherein a given one of the at least two visual devices is registered by a second controller device in the set of two or more interconnected controller devices at a second location different than the first location, the first controller device utilizing previously-established registration data for the given visual device received from the second controller device to establish the wireless pairing with the given visual device when the given visual device is within a designated range of the first location;

to receive, at the first controller device, a request to initiate a sharing action between the at least two visual devices wirelessly paired with the first controller device;

to select, using at least one user interface feature of the first controller device, a source visual device for the sharing action;

to select, using the at least one user interface feature of the first controller device, at least one destination visual device for the sharing action; and to provide one or more resources from a display of the source visual device to at least one display of the at least one destination visual device by:

streaming the one or more resources from the source visual device to the first controller device in a first display format supported by the source visual device;

converting the one or more resources from the first display format supported by the source visual device to at least a second display format supported by the at least one destination visual device; and streaming the one or more resources in the second display format from the first controller device to the at least one destination visual device.

14. The computer program product of claim 13 wherein the first controller device comprises a visual panel configured to present selectable display elements corresponding to visual devices currently paired with the first controller device.

15. The computer program product of claim 14 wherein selecting the source visual device for the sharing action comprises utilizing the at least one user interface feature of the first controller device to navigate to and select a given one of the selectable display elements corresponding to the source visual device in the visual panel.

16. The computer program product of claim 15 wherein selecting the given selectable display element corresponding to the source visual device in the visual panel further comprises utilizing the at least one user interface feature to select at least one selectable display element corresponding to the one or more resources from the display of the source visual device in the visual panel.

17. The computer program product of claim 15 wherein selecting the at least one destination visual device comprises utilizing the at least one user interface feature to drag and drop the one or more resources from the display of the source visual device to at least one selectable display element corresponding to the at least one destination visual device in the visual panel.

18. An apparatus comprising:

at least one processing device comprising a processor coupled to a memory;

the at least one processing device being configured to implement a first controller device configured:

to establish, at the first controller device at a first location, a wireless pairing with at least two visual devices, the first controller device being one of a set of two or more interconnected controller devices, the set of interconnected controller devices being physically distinct from the at least two visual devices, wherein a given one of the at least two visual devices is registered by a second controller device in the set of two or more interconnected controller devices at a second location different than the first location, the first controller device utilizing previously-established registration data for the given visual device received from the second controller device to establish the wireless pairing with the given visual device when the given visual device is within a designated range of the first location;

to receive a request to initiate a sharing action between the at least two visual devices wirelessly paired with the first controller device;

to select, using at least one user interface feature of the first controller, a source visual device for the sharing action;

to select, using the at least one user interface feature of the first controller device, at least one destination visual device for the sharing action; and to provide one or more resources from a display of the source visual device to at least one display of the at least one destination visual device by:

streaming the one or more resources from the source visual device to the first controller device in a first display format supported by the source visual device;

converting the one or more resources from the first display format supported by the source visual device to at least a second display format supported by the at least one destination visual device; and streaming the one or more resources in the second display format from the first controller device to the at least one destination visual device.

19. The apparatus of claim 18 further comprising a visual panel configured to present selectable display elements corresponding to visual devices currently paired with the first controller device, and wherein:

selecting the source visual device for the sharing action comprises utilizing the at least one user interface feature of the first controller device to navigate to and select a given one of the selectable display elements corresponding to the source visual device in the visual panel; and selecting the at least one destination visual device comprises utilizing the at least one user interface feature to drag and drop the one or more resources from the display of the source visual device to at least one selectable display element corresponding to the at least one destination visual device in the visual panel.

20. The apparatus of claim 18 further comprising a rolling mouse interface device providing the at least one user interface feature.

* * * * *